US005862179A

United States Patent [19]
Goldstein et al.

[11] Patent Number: 5,862,179
[45] Date of Patent: Jan. 19, 1999

[54] MAPPER FOR HIGH DATA RATE SIGNALLING

[75] Inventors: Yuri Goldstein; Yuri Okunev, both of Southbury, Conn.

[73] Assignee: General DataComm, Inc., Middlebury, Conn.

[21] Appl. No.: 807,955

[22] Filed: Mar. 4, 1997

Related U.S. Application Data

[63] Continuation-in-part of Ser. No. 801,066, Feb. 14, 1997.
[51] Int. Cl.$^6$ .................................................. H04B 14/04
[52] U.S. Cl. ........................................... 375/242; 375/295
[58] Field of Search ................................... 375/295, 242, 375/240, 261, 279, 280, 298, 308

[56] References Cited

U.S. PATENT DOCUMENTS

| 4,791,654 | 12/1986 | De Marca et al. | 375/242 |
|---|---|---|---|
| 5,150,381 | 9/1992 | Forney et al. | 375/261 |
| 5,321,725 | 6/1994 | Paik et al. | 375/261 |
| 5,394,437 | 2/1995 | Ayanoglu et al. | 375/222 |
| 5,406,583 | 4/1995 | Dagdeviren | 375/216 |
| 5,493,586 | 2/1996 | Brownlie et al. | 375/261 |
| 5,528,625 | 6/1996 | Ayanolglu et al. | 375/222 |

FOREIGN PATENT DOCUMENTS

WO95/15924 12/1995 WIPO .

OTHER PUBLICATIONS

ITU–T Recommendation V.34, Sep. 1994, "Data Communication Over the Telephone Network".
"The Capacity of PCM Voiceband Channels", Kalet, et al., IEEE Intern'l Conference on Communications'93, pp. 507–511.
"A Mathematical Theory of Communication", Bell Systems Techinical Journal, 27:379–423, 623–656.

*Primary Examiner*—Tesraldet Bocure
*Attorney, Agent, or Firm*—David P. Gordon; David S. Jacobson; Thomas A. Gallagher

[57] ABSTRACT

A pulse amplitude modulated (PAM) mapper includes a constellation matrix memory which stores indications of a plurality of different constellations, wherein at least one of the different stored constellations is of different dimension than another of the stored constellations. The constellations are used individually or together to support a plurality of different modem data rates. In a preferred embodiment, the mapper also includes a logic block, a constellation controller, a PAM code generation block, and an output register. The logic block receives incoming bits and groups the bits as a function of the desired or agreed upon bit rate as indicated by the constellation controller, and provides a plurality of each group of bits to the PAM code generation block, and one or more sign bits to the output register. The PAM code generation block uses the provided bits to choose at least one point from one of the constellations, and uses each chosen constellation point to generate a PAM code (typically $\mu$-law or A-law code level) word. Each PAM code word is provided to the output register, and together with associated sign bits generates output bytes. Algorithms are provided for choosing multiple points from the 2D and higher dimensional constellations from provided groups of bits, and for limiting power by substituting combinations of high-power constellation points with otherwise unused lower-power combinations.

20 Claims, 4 Drawing Sheets

FUNCTIONAL BLOCK –DIAGRAM OF 5-TO-8 BITS MAPPING

FUNCTIONAL BLOCK –DIAGRAM OF 6-TO-8 BITS MAPPING

MAPPER FOR HIGH DATA RATE SIGNALLING

This is a continuation-in-part of U.S. Ser. No. 08/801,066, filed Feb. 14, 1997 entitled "Mapper for High Data Rate Signalling", which is hereby incorporated by reference herein in its entirety.

BACKGROUND OF THE INVENTION

1. Field of the Invention

The present invention relates to data communications equipment. More particularly, the present invention relates to mapping systems and methods having advantageous applications in high speed modems which are coupled to an analog local loop.

2. State of the Art

With the ever-increasing importance of telecommunications for the transfer of-data as well as voice, there has been a strong effort to increase data transfer rates over the telephone wires. Recently, the ITU-T adopted the V.34 Recommendation (International Telecommunication Union, Telecommunication Standardization Sector Recommendation V.34, Geneva, Switzerland 1994) which is hereby incorporated by reference herein in its entirety. The V.34 standard and subsequent amendments define modem operating speeds of 28.8 kbps up to 33.6 kbps, and the vast majority of modems being sold today adhere to the V.34 Recommendation. However, with the explosion in the use of the Internet, even at the V.34 transfer rates, downloading of large files available on the Internet can take long periods of time. Thus, recently, there has been a thrust to provide additional standards recommendations which will increase data transfer rates even further (note the TIA TR-30.1 PAM Modem ad hoc group and the ITU-T Study Group 16).

Recognizing that further increases in data rates is theoretically limited where the telecommunication network is an analog system (see C. E. Shannon, "A Mathematical Theory of Communication," *Bell System Technical Journal*, 27:379–423, 623–656 (1948)), there have been various proposals to take advantage of the fact that much of the telecommunication network is now digital. For example, U.S. Pat. No. 5,394,437 to Ayanoglu et al., U.S. Pat. No. 5,406,583 to Dagdeviren, and U.S. Pat. No. 5,528,625 to Ayanoglu et al. (all assigned to AT&T/Lucent and all of which are hereby incorporated by reference herein in their entireties) all discuss techniques which utilize the recognition that the network is mostly digital in order to increase data transmission rates to 56 kbps and higher. Similarly, Kalet et al., "The Capacity of PAM Voiceband Channels," *IEEE International Conference on Communications '93*, pages 507–511 Geneva, Switzerland (1993) discusses such a system where the transmitting end selects precise analog levels and timing such that the analog to digital conversion which occurs in the central office may be achieved with no quantization error. PCT application, number PCT/US95/15924 (Publication WO 96/18261) to Townshend which is hereby incorporated by reference herein in its entirety) discusses similar techniques. All of the disclosures assume the use of PAM (pulse amplitude modulation) digital encoding technology rather than the QAM (quadrature amplitude modulation) currently used in the V.34 Recommendation. The primary difference between the AT&T technology and the Townshend reference is that the AT&T technology suggests exploiting the digital aspect of the telephone network in both "upstream" and "downstream" directions, while Townshend appears to be concerned with the downstream direction only. Thus, systems such as the "x2" technology of US Robotics which are ostensibly based on Townshend envision the use of the V.34 Recommendation technology for upstream communications.

As will be appreciated by those skilled in the art, the technologies underlying the V.34 Recommendation, and the proposed 56 kbps modem are complex and typically require the use of high-end digital signal processors (DSPs). One of the complex tasks of the modem is the mapping of digital data into a sequence of digital signals chosen from a constellation which are converted into an analog signal by a D/A converter. Mapping typically includes utilizing a constellation. In the V.34 Recommendation, the preferred constellation is a four-dimensional constellation, whereas in the envisioned 56 kbps modems, the constellation is envisioned as a one dimensional PAM constellation which complies with $\mu$-law (A-law in Europe) requirements. According to $\mu$-law requirements which are set forth in ITU-T Recommendation G.711 which is hereby incorporated by reference herein in its entirety, the total constellation consists of 255 signal levels; 127 positive, 127 negative, and zero. Both the positive portion of the constellation and the negative portion of the constellation include eight sectors with sixteen points each (the constellation being shown in Appendix 1 hereto), with zero being a common point for both portions. As is well known in the art, the minimum distance between points in sector 1 of the constellation is a distance "2". In sector 2, the minimum distance is "4", while in sector 3, the minimum distance is "8". In the eighth sector, the minimum distance is "256".

Using the full PAM $\mu$-law constellation, theoretically, a bit rate of almost 64 kbps can be transmitted over the analog local loop to the digital network. However, the average power of such a constellation would be about −4 dBm, and the minimum distance between points would be a distance of "2". Such a large average power is undesirable when compared to the present restrictions of an average power of −12 dBm on the network; and such a minimum distance is also undesirable, with minimum distances of at least "4" and preferably "8" being considerably more desirable in reducing errors due to noise.

In light of the power restrictions, and minimum distance considerations, the prior art primarily discusses sending data at 56 kbps (i.e., seven bits per symbol at an 8 kHz rate). In order to increase the bit rate to 60 kbps, (e.g., 7.5 bits per symbol), a sequence of symbols could be sent, with every other symbol carrying seven bits and eight bits respectively. However, for reasons set forth above (average power, and minimum distance), the carrying of eight bits per symbol is not feasible.

SUMMARY OF THE INVENTION

It is therefore an object of the invention to provide a PAM mapper for a high speed modem with data rates of up to 60 kbps.

It is another object of the invention to provide a PAM mapper which enables data rates of 40 kbps to 60 kbps with fine data rate steps.

It is a further object of the invention to provide a PAM mapper and methods utilizing a PAM mapper which optimize signal sets based on desired average power requirements and desired minimum distances between points in the PAM constellations.

It is an additional object of the invention to provide a PAM mapper which is simple to implement and which does not require large computing and memory resources.

In accord with the invention, a mapper for a PAM encoder is provided and includes means for generating desired µ-law or A-law code levels, and a constellation matrix memory which stores indications of a plurality of different N-dimensional constellations (N being a positive integer), wherein at least one of the different stored constellations is of different dimension than another of the stored constellations. As will become apparent hereinafter, the plurality of different constellations are used individually or together to support a plurality of different modem data (bit) rates.

In addition to the means for generating desired code levels and constellation matrix memory, the mapper preferably includes a logic block which receives incoming bits of information, groups the bits as a function of the desired or agreed upon data rate, and provides a plurality of each group of bits (i.e., a subgroup) to the means for generating desired code levels. The means for generating desired code levels uses those bits to choose at least one point from one of the constellations, and uses each chosen constellation point for generating the desired code levels. In one embodiment, the means for generating desired code levels comprises an address computation block and a PAM code memory, where the address computation block chooses a constellation point and that the constellation point is used as a pointer to a location in the PAM code memory which preferably stores a plurality of seven-bit PAM code words. The seven-bit PAM code word chosen from the PAM code memory is then provided as an output with an eighth bit (which is used as the sign bit) which is drawn from one or more of the bits (another subgroup) of the group of bits formed by the logic block. Alternatively, where the desired output code is a PCM code, the means for generating desired code levels is simply the address computation block which chooses a constellation point indication and generates a seven-bit PCM code output from the chosen constellation point indication.

According to one embodiment of the invention, in order to provide for data rates in excess of 56 kbps, both one- and two-dimensional constellations are utilized. In using a two-dimensional (2D) constellation, the logic block, which groups incoming bits of information, can group fifteen bits of information together. When fifteen bits are grouped together, two bits are used as the sign bits for two eight-bit output bytes while the thirteen other bits are provided to the address computation block which divides the thirteen bit number by 91 modulo 91 to generate an integer part of a quotient and the remainder. The integer part of the quotient is used to select one of 91 points (representing both positive and negative values) of a predetermined two-dimensional PAM constellation, while the remainder is used to select another of the 91 points of the PAM constellation (it being appreciated that the possible 8281 (91×91) combinations of points is sufficient to cover the 8192 (2^13) combinations of thirteen bits). The two selected constellation points are used to generate (e.g., by pointing to two locations in the PAM code memory, or alternatively in the case of PCM, by direct generation) two seven-bit numbers to which the sign bits are added to provide the two eight-bit outputs.

If all bits received by the logic block are grouped into groups of fifteen bits, a data rate of 60 kbps can be achieved. According to the preferred embodiment of the invention, however, the bit rate may be chosen at 0.5 kbps increments from 40 kbps (or below, if desired) up to 60 kbps. To achieve all of these rates, indications for four different constellations are stored in the constellation matrix memory. Preferably, each constellation is chosen to obtain the largest separation at a power of about −12 dBm to the extent possible. Thus, for example, a thirty-two point constellation (sixteen positive and sixteen negative points) is provided with a minimum distance of 96, and a power of −12.1 dBm and can be used for the coding of a five-bit input group (one of the five bits being used as a sign bit). Similarly, a sixty-four point constellation is provided with a minimum distance of 36 and a power of −12.2 dBm and can be used for a six-bit input group. A one hundred twenty-eight point constellation is provided with a minimum distance of 16 and a power of −12.1 dBm for use with a seven-bit input group, while the one hundred eighty-two point constellation is provided with a minimum distance of 8 and a power of −8.7 dBm for use with a fifteen point group. In order to obtain different data rates, data frames may be set up which utilize different constellations in the frame, such that the incoming data bits are grouped in groups of different numbers of bits according to the frame. For example, to obtain a data rate of 59.5 kbps, seven groups of fifteen bits would be grouped together for every two groups of seven bits.

Where a data rate of 56 kbps or less is chosen, as suggested above, the bits are grouped into five, six, or seven bit groups, with groups of different numbers of bits alternating in a frame to obtain specifically desired rates. In each case, one bit of the group is used as the sign bit for an output byte, and the remaining bits are used by the address computation block of the code generation means to access an indication of a constellation point. The constellation point is then used to generate a seven-bit word (e.g., by selecting a PAM code memory location), and the seven-bit word is output with the sign bit to generate the PAM coded eight-bit byte.

As suggested above, by grouping incoming bits into groups of five, six, seven, and fifteen bits, and by storing indications of a plurality of constellations and using the bits to select a constellation point which is used in generating a code level output, a simple mapper for a high speed modem is provided which enables bit rates of up to 60 kbps with 0.5 kbps steps or less.

According to another aspect of the invention, higher dimensional constellations (e.g., 3D, 4D, 5D, 6D, ...) may be utilized to obtain high bit rates with desired minimum distances and desired power. For example, in a preferred embodiment, 4D and 8D constellations are utilized in conjunction with constellations of other dimensions (2D and 1D) to obtain desired data rates. One of the 4D constellations (which helps permit bit rates in excess of 56 kbps) includes 154 points (77 indications being stored in the 8×16 array), which permits a group of twenty-nine bits to be mapped into four outgoing symbols. With twenty-nine bits, a subgroup of four bits are used as the sign bits, and another subgroup of the remaining twenty-five bits are used to select four of the 77 indications, as $2^{25}$ is less than $77^4$. Similarly, one of the 8D constellations includes 140 points (seventy indications), which permits a group of fifty-seven bits to be mapped into eight outgoing symbols. With fifty-seven bits, a subgroup of eight bits are used as the sign bits, and a subgroup of the remaining forty-nine bits are used to select eight indications of the seventy indications (140 point) constellation.

A preferred manner of selecting constellation points of an N-dimensional constellation comprises, taking a group of x bits (where $2^{x-N} < L^N$ with L=the number of positive points or indications in the constellation), using the N most significant of the x bits as the sign bits for the N output symbols, and dividing the value represented by the x−N remaining bits by $L^{N-m}$ (where m is a variable which takes values from 1 to N−1 sequentially) to obtain quotients and remainders. The first quotient is used to select a first constellation point value which is used for generating a first code level output. If N–m equals one, the first remainder is used to select another constellation point. However, if N–m is greater than one, m is increased by one, and the remainder is divided by $L^{N-m}$ to obtain a second quotient and a second remainder, with the second quotient being used to select a second constellation point value. If the N–m is equal to one, the second remainder is used to select a third constellation point value; otherwise, m is again increased and the remainder divided by $L^{N-m}$. The process is continued until N–m equals one, and the last remainder is used to select the N'th constellation point value.

According to another preferred aspect of the invention, remapping algorithms are provided which even further reduce the power of the multidimensional PAM constellations utilized in accord with the invention. The provided remapping algorithms reduce power by substituting combinations of high-power constellation points with otherwise unused lower-power combinations. For example, in the 2D constellation utilizing 91 points, only 8192 ($2^{13}$) of the 8281 ($91^2$) available combinations are required to identify thirteen bits. Thus, high power combinations (e.g., such as would be sent by the pair of identifiers 89 90), can be replaced by an otherwise unused lower power combination (such as 90 02).

A preferred 2D remapping algorithm generally comprises dividing the digital value of the grouped by bits by a determined value to obtain a quotient (q) and a remainder (r), increasing the quotient by one to obtain a new quotient (q*), using q* and r to choose PAM code output values if both q* and r are below a threshold value(s), and resetting q* to a lower value (e.g., 0), and recalculating r if the quotient and the remainder are both greater than the threshold value(s). The recalculated r=r* is preferably recalculated as a function of r and q.

Additional objects and advantages of the invention will become apparent to those skilled in the art upon reference to the detailed description taken in conjunction with the provided figures.

Appendix 1 is a prior art chart of the flaw code.

Figure 2:
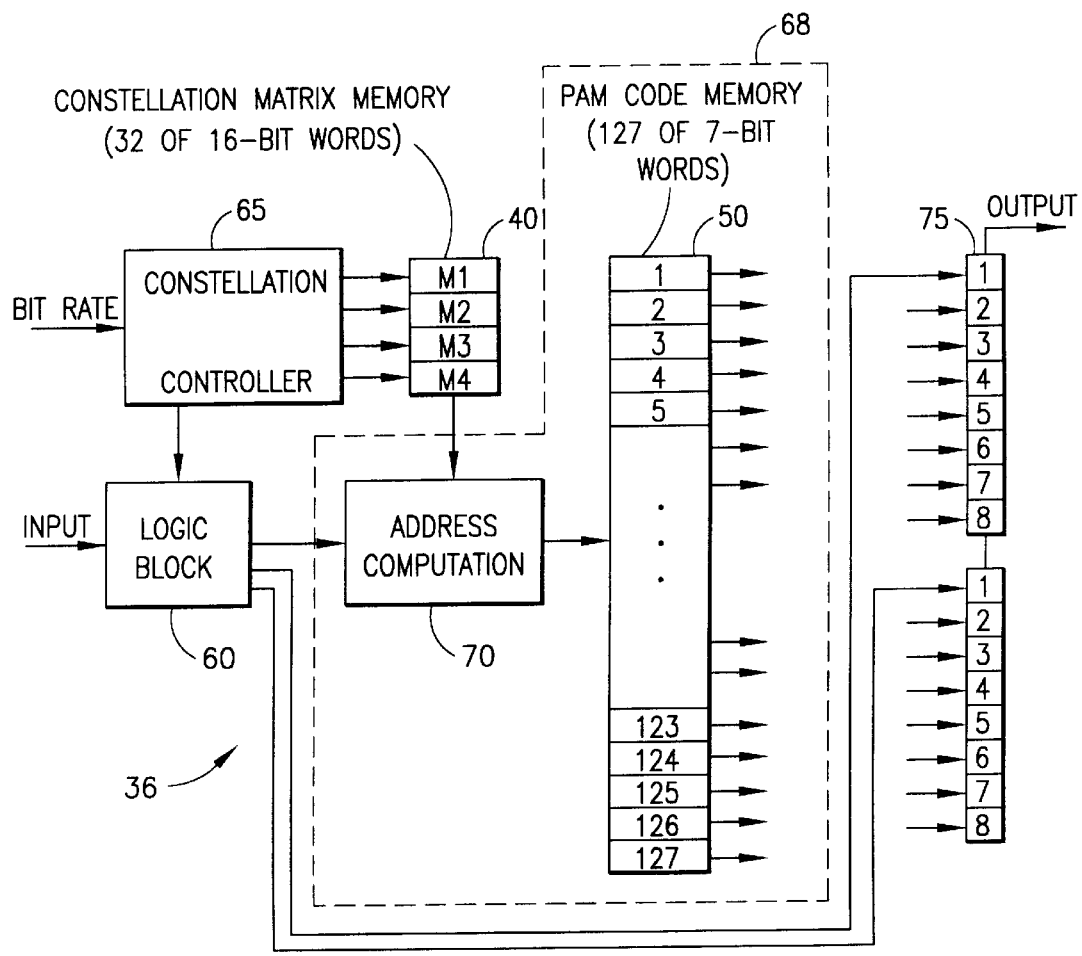
FIG. 2 is a block diagram of the mapper of FIG. 1 according to a first embodiment the invention.

Appendix 2 is a listing of four preferred constellations utilized in the mapper of the embodiment of FIG. 2 of the invention.

Figure 4:
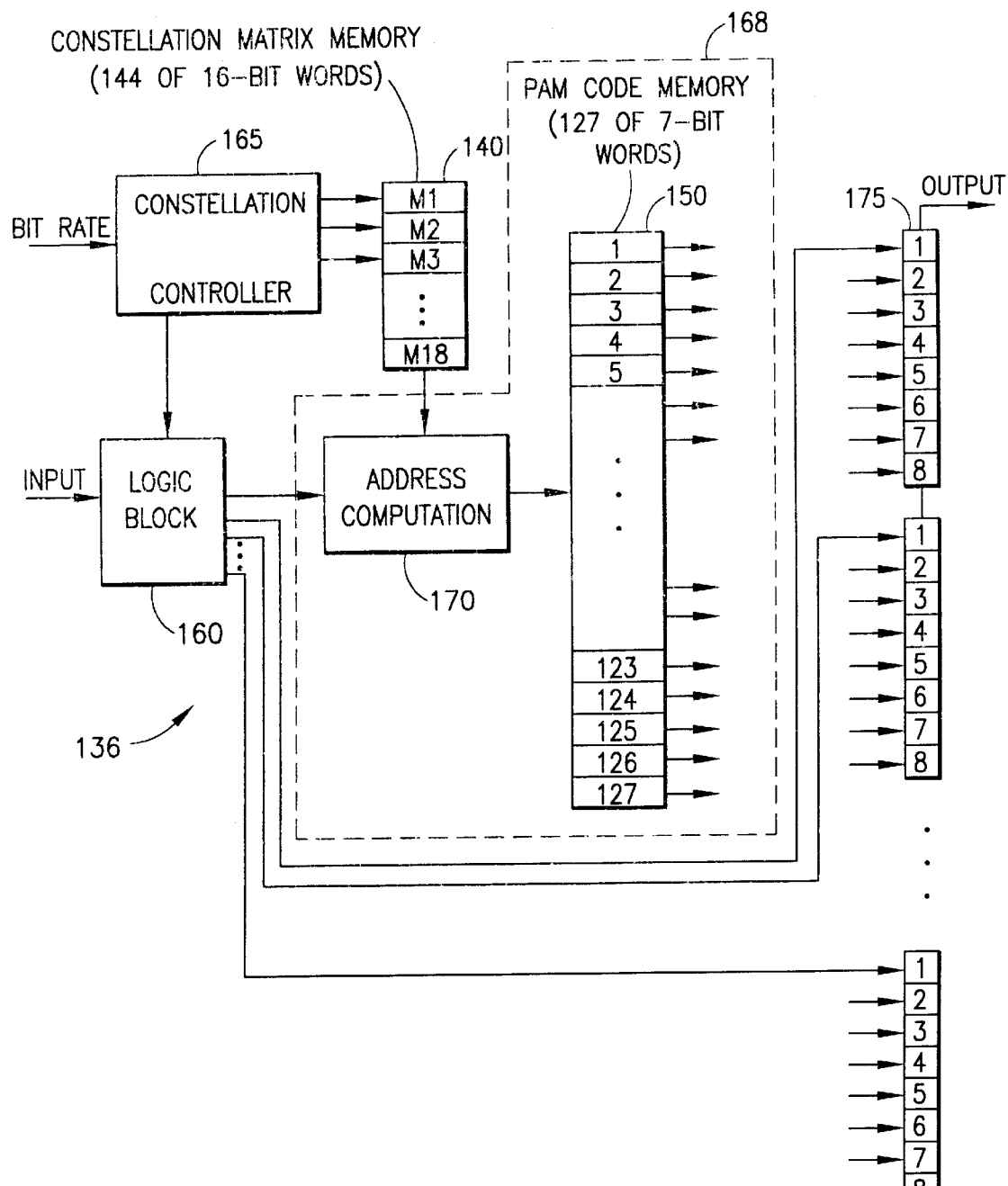
FIG. 4 is a block diagram of a mapper according to a second embodiment of the invention.

Appendix 3 is a listing of eighteen preferred constellations utilized in the mapper of the embodiment of FIG. 4 off the invention.

Table 1 is a listing of mapping parameters implemented by the mapper of the embodiment of FIG. 2 the invention, including the numbers of fifteen-bit pairs, seven-bit symbols, six-bit symbols, and five bit symbols.

Table 2 is a listing representing the mapping of thirteen bit binary combinations into pairs of eight bit outputs.

Table 3 is a listing of mapping parameters implemented by the mapper of the embodiment of FIG. 4 of the invention.

DETAILED DESCRIPTION OF THE PREFERRED EMBODIMENT

Figure 1:
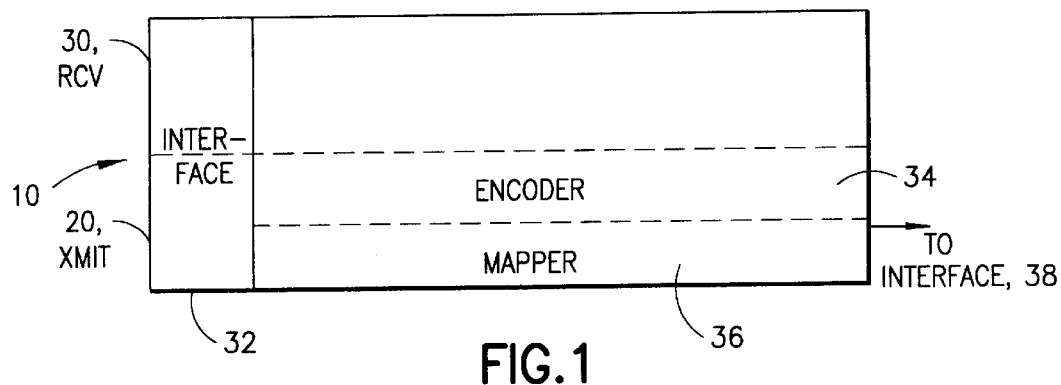
FIG. 1 is a high level block diagram of the PAM modem of the invention.

Turning to FIG. 1, a high level block diagram of a PAM modem 10 is seen. The modem 10 broadly includes a transmitter 20 and a receiver 30. The transmitter includes an interface 32 to a source of digital data (such as a computer), an encoder 34 which includes a mapper 36 and may optionally include a Trellis or convolutional encoder (not shown), and an interface 38. Details of the receiver side of the modem are well known and are not shown in FIG. 1.

According to a first embodiment of the invention, and as seen in FIG. 2, the mapper 36 for the PAM encoder 34 preferably includes a constellation matrix memory 40, a logic block 60 for arranging data, a constellation controller 65 coupled to the constellation matrix memory 40 for selecting a constellation from the constellation matrix memory, means for generating output code levels 68 which is coupled to the logic block 60 and to the constellation matrix memory 40, and an output register 75. In one embodiment of the invention, the means for generating output code levels 68 includes an address computation block 70 and a PAM code memory 50. In another embodiment of the invention, and as will be described in more detail hereinafter, the means for generating output code levels 68 includes only the address computation block 70. It should be appreciated that the constellation controller 65, logic block 60, and address computation block 70 can be implemented in a single hardware element, or separate hardware elements, or as software, or as a combination of software and hardware, while the constellation matrix memory 40 (and PAM code memory 50, if utilized) can be implemented in one or more memory elements. The output register 75 may be incorporated in the memory element with the constellation matrix memory and/or PAM code memory, or may be a separate register as desired.

The constellation matrix memory 40 stores indications of a plurality of different PAM constellations for a plurality of different bit rates; indications for four different constellations being shown in FIG. 2, with one of the constellations (constellation #1) being a two-dimensional constellation. Preferably, the constellation matrix memory is configured as a plurality (e.g., four) of eight by sixteen-bit blocks such as seen in Appendix 2. Thus, as discussed in more detail below, each block, if desired, can point to all one hundred twenty-eight possible positive or negative $\mu$-law levels (seen in Appendix 1) stored in the PAM code memory 50, with each row of the block pointing to a different $\mu$-law sector, and each bit in the row representing a different level in the sector.

For purposes herein, and as will be explained in more detail hereinafter with reference to Appendices 2 and 3, the terms "two-dimensional constellation" or "multi-dimensional constellation" refer to constellations having other than $2^c$ points (where c is a positive integer) which are utilized, where a single subgroup of bits is used to select more than one point from the constellation.

As seen in Appendix 2, different preferred constellations for the first embodiment of the invention are represented in the constellation matrix memory 40 by setting different values in the matrix. Preferably, and in accord with the invention, the points of the constellation are chosen to maintain a maximum "minimum distance", as well as to provide a power of nearly –12 dBm. For a thirty-two point constellation, sixteen bits of the eight by sixteen-bit block are set to value 1; it being appreciated that the positive and negative values of the sixteen set values will provide thirty-two desired points. As seen in Appendix 2, in order to maintain a large distance with a power of –12.1 dBm, the constellation points chosen include a single point in sector 2, a single point in sector 3, three points in sector 4, five points in sector 5, and six points in sector 6. By choosing no points in sectors 7 and 8, the power is kept down, and by choosing no points in sector 1, and only a single point in sectors 2 and 3, the minimum distance is made large. Similarly, for the sixty-four point constellation, as seen in Appendix 2, thirty-two bits of another eight by sixteen-bit block are set. Optimally, by choosing one point in sector 1, two points in sector 2, three points in sector 3, five points in sector 4, eight points in sector 5, thirteen points in sector 6, and no points in sectors 7 and 8, the power is kept down, while the minimum distance is a distance of thirty-six. In the one hundred twenty-eight point constellation, sixty-four bits of the block are set as seen in Appendix 2 to obtain a minimum distance of sixteen and a power of −12.1 dBm. Finally, in the one hundred eighty-two point 2D constellation, ninety-one bits (of the possible one hundred twenty-eight bits) are set, and a minimum distance of eight is maintained, while the power is set to −8.7 dBm (which is unavoidably higher than presently desired).

As will be discussed in more detail below, according to the invention, the choice of constellations being used from the constellation matrix memory 40 at any given time is dependent on the chosen data transmission bit rate. Thus, when a bit rate is determined (by any appropriate means or method), the constellation controller 65 chooses appropriate constellations in a sequential fashion. More particularly, as set forth in Table 1, for a bit rate of forty kbps, five-bit symbols (corresponding to a thirty-two bit constellation) can be utilized exclusively, while for a bit rate of forty-eight kbps, six-bit symbols (corresponding to a sixty-four bit constellation) can be utilized exclusively. However, for bit rates between 40 kbps, and 48 kbps, a combination of five-bit and six-bit symbols are required. Thus, for a bit rate of 42.5 kbps, for every five six-bit symbols, eleven five-bit symbols are required. Thus, the constellation controller 65 could interleave the choice of constellations accordingly in a frame; e.g., M4-M4-M3-M4-M4-M3-M4-M4-M3-M4-M4-M3-M4-M4-M3-M4 and repeat the same sequence (frame) to maintain the desired bit rate. Similarly, for other bit rates between forty and forty-eight kbps, other combinations of five-bit and six-bit symbols are required as set forth in Table 1.

When the choice of constellation is made by the constellation controller 65, the constellation controller concurrently sends an indication to the logic block 60, so that the logic block can group the incoming bits accordingly. Thus, for example, when the constellation controller chooses the M4 constellation (thirty-two point), a signal is provided to cause the logic block 60 to group five incoming bits together and provides a first of those five bits as a sign bit to a first bit location of the output register 75. The remaining four bits are provided to the address computation block 70 of the code generation means 68 which uses the four bits to choose an indicated constellation point of the M4 constellation (sixteen bits of the sixteen by eight-bit matrix having been set to a value one as seen in Appendix 2). For example, if the four bits used to choose the constellation point have a value of "1011", the eleventh (1011 base 2=11 base 10) set location in the M4 constellation (e.g., using M4 of Appendix 2, the second level of segment six) would be chosen. The indicated constellation point (having both a sector and level indicator due to its location in the matrix) is then used by the address computation block 70 either to directly generate an output PCM $\mu$-law code (e.g., by subtracting the location of the chosen constellation point indication in the 8×16 bit array from 128 and providing a seven-bit digital output of the difference value), or to generate an output PAM code by using the constellation point indication as a pointer to the PAM code memory 50 (e.g., to sector 6, level 81 of Appendix 1). The seven bit word (e.g., 0101110; A the seven least significant bits of the Code of Appendix 1) stored at the PAM code memory location indicated by the constellation point is then provided to the second through eighth bit positions of the output register 75. The seven lsbs, together with the sign bit provided from the logic block 60 provide an eight-bit byte for output to the digital/analog converter. This is seen in functional block diagram 3a, where five data bits are grouped together, and a first of the five bits is used as a sign bit of an output byte, while the other four of the data bits are used to generate the seven additional bits of the output byte.

Figure 3A:
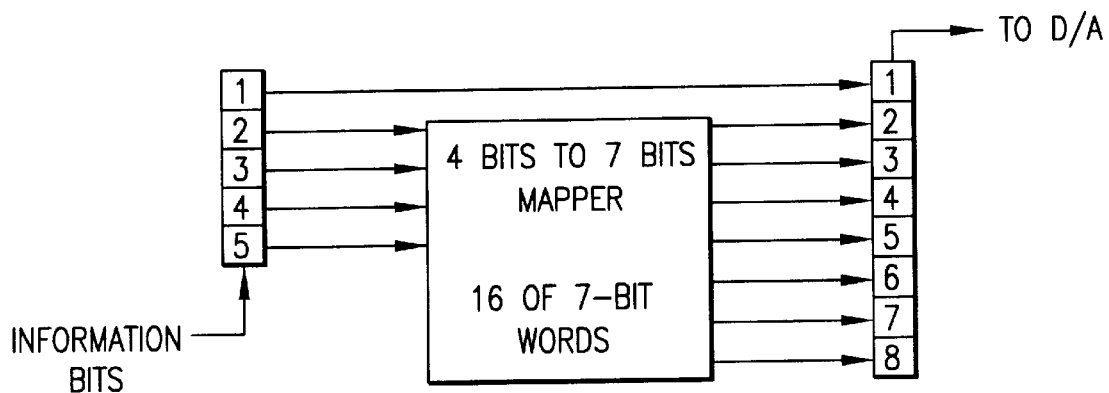
FIGS. 3a–3d are functional block diagrams of the four-to-seven bit, the five-to-seven bit, the six-to-seven bit, and the thirteen-to-two-by-seven bit mappers implemented in the mapper of FIG. 2.
Figure 3B:
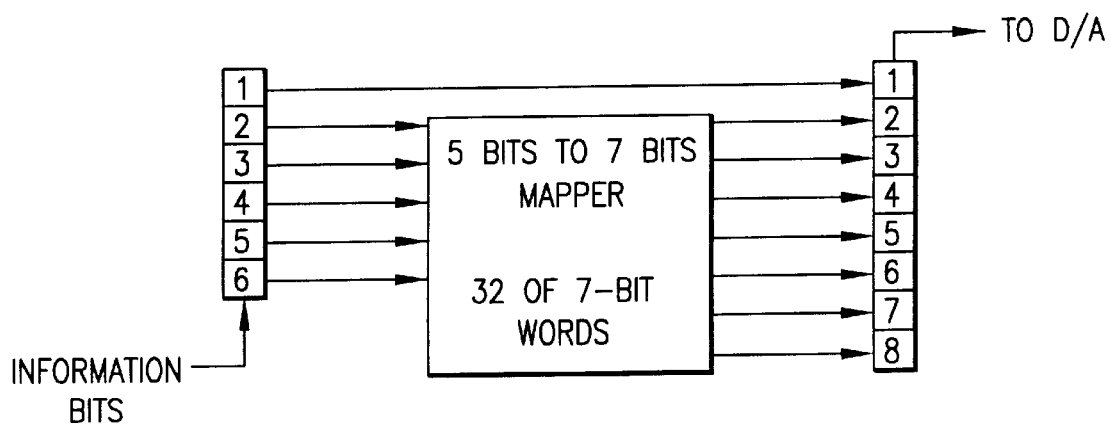

In a similar manner, when the M3 constellation is chosen by the constellation controller 65, the logic block 60 is provided with a signal which causes it to group together six incoming bits. A first of those six bits is used as a sign bit and provided to the first bit location of the output register 75. The remaining five bits are provided to the address computation block 70 which uses the five bits to choose an indicated constellation point of the M3 constellation (thirty-two bits of the sixteen by eight matrix having been set to a value one for the M3 constellation as seen in Appendix 2). The indicated constellation point is then used by the address computation block 70 either as a pointer to the PAM code memory 50, or in a direct manner as discussed above, to generate a seven bit word which is provided to the appropriate bit locations in the output register 75. The seven lsbs, together with the sign bit provided from the logic block 60 provide an eight-bit byte for output to the digital/analog converter. This is seen in functional block diagram FIG. 3b, where six data bits are grouped together, and a first of the six bits is used as a sign bit of an output byte, while the other five of the data bits are used to generate the seven additional bits of the output byte.

As suggested by Table 1, in order to generate data rates of between forty-eight and fifty-six kbps, groups of six bits and seven bits are utilized in conjunction with the M3 and M2 constellations. As suggested by FIG. 3c, when seven bits are grouped together, one bit is used as the sign bit, and the remaining six bits are used to generate the seven remaining bits of the output byte. The six bits generate the seven remaining bits by choosing one of the sixty-four set bits of the matrix storing constellation M2, which in turn either points to a PAM code memory location which stores a seven-bit word, or which is used to generate the seven-bit word.

Figure 3C:
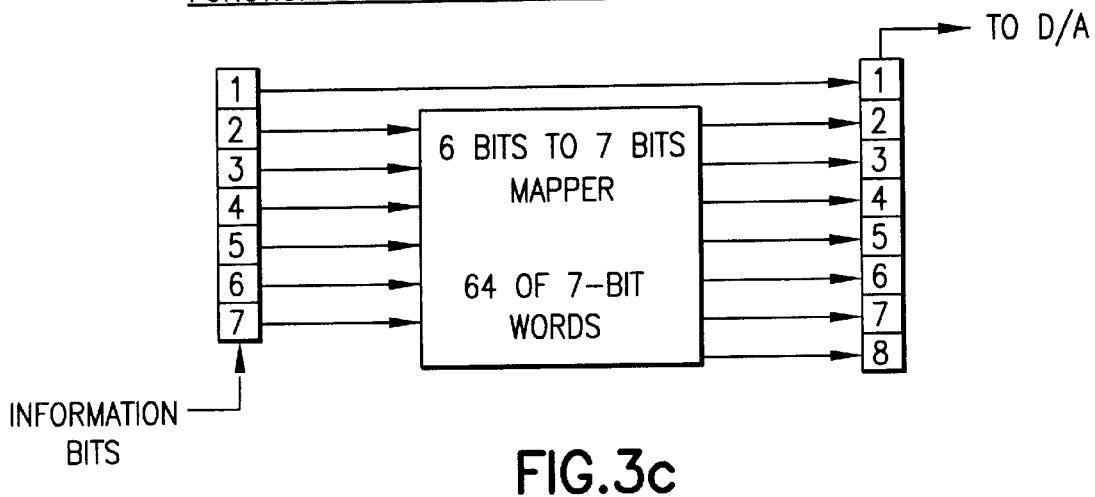
Figure 3D:
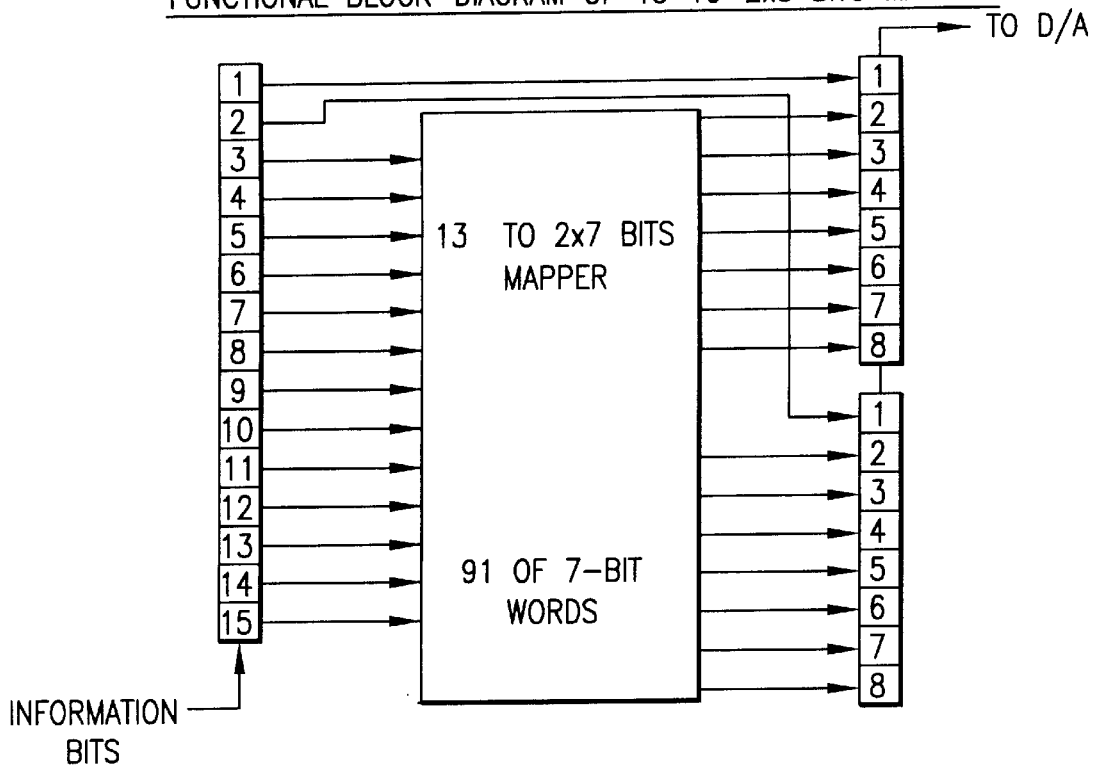

Turning back to Table 1 in conjunction with FIGS. 2, 3c, and 3d, the mechanism for generating bit rates of between fifty-six and sixty kbps is slightly different than the previously described mechanisms. In particular, according to the first embodiment of the invention, instead of using a combination of seven- and eight-bit symbols, a combination of seven-bit symbols and fifteen-bit symbol pairs are utilized. For example, to generate a data rate of fifty-eight kbps, four fifteen-bit symbols pairs from the 2D constellation M1 are utilized on conjunction with eight seven-bit symbols from constellation M2 in a repeating four symbol pattern; e.g., M2-M1-M1-M2. The seven-bit symbols are used as set forth above with reference to FIG. 3c. However, according to the invention, the fifteen-bit symbol pairs are generated differently. Thus, when a fifteen-bit pair is indicated by the constellation controller, the two-dimensional M1 constellation is chosen from the matrix memory, and fifteen bits are grouped together by the logic block 60. As indicated by FIGS. 2 and 3d, of the fifteen bits, a subgroup of two bits are used as sign bits for two output bytes which are generated at the output register 75. Thus, one sign bit is sent to a first bit location, and the other sign bit is sent to the ninth bit location of the sixteen-bit output register 75. A subgroup of the remaining thirteen bits are used to select two constellation points from the ninety-one set bits of the M1 constellation matrix (it being noted that M1 is therefore defined as a 2D constellation). According to the preferred embodiment of the invention, in order to select two constellation points or indications, the value of the thirteen bits is divided by ninety-one to obtain a quotient (q) and a remainder (r). The quotient is used to select a first one of the ninety-one set bits (i.e., indications), and the remainder is used to select another of the ninety-one set bits as suggested by Table 2 (it being noted that where the quotient and remainder are the same, the selected indication from the constellation will be the same). As described above, the selected indications are used either to directly generate seven-bit words or to point to locations in the PAM code memory 50 which store seven-bit words. Regardless, the seven bit words generated are provided to bit locations two through eight and ten through sixteen of the output register 75, and together with the sign bits, generate two eight-bit bytes (octets) for output.

Before turning to FIG. 4, it should be noted that the power (dBm) and minimum distances ($D_{min}$) set forth in Table 1 with respect to the 2D constellation and the embodiment of FIG. 2 can be improved even further while obtaining the same data rates by utilizing a remapping algorithm. In particular, it will be appreciated that the 2D constellation utilizing 91 points provides 8281 ($91^2$) possible combinations to describe 8192 ($2^{13}$) points. Thus, the pairs of 7-bit output combinations shown in Table 2 include high-power combinations including, e.g., P89 P90, while certain lower power combinations such as P90 P02 which, if used in lieu of the higher power combinations would reduce the power of the constellation, go unutilized. Thus, in accord with the presently preferred embodiment of the invention, a "remapping" is accomplished by modifying the address computation conducted by the address computation block 70. According to the preferred algorithm for the 2D constellation, the quotient (q) obtained by dividing the thirteen bit digital value by ninety-one is increased by a predetermined value (preferably 1) to obtain a modified quotient (q*), and q* and the remainder (r) are both compared to a threshold value(s) (both are preferably compared to the value eighty-two for this 2D constellation). If either q* or r is less than or equal to the threshold value(s), both q* and r are used to find indications (set bits) in constellation matrix M1 of memory 40, which in turn choose 7-bit PAM code words in PAM code memory 50 as described above. However, if both q* and r are greater than the threshold value(s), q* is reset to a lower value (preferably 00), and the remainder is recalculated to obtain a modified remainder (r*). The modified remainder is preferably a function of the remainder r and the quotient q; and the function is preferably a linear equation of the form $r^*=k1-r-k2(q)$. For the 2D constellation using 91 positive points, the preferred function is $r^*=804-r-8(q)$. Both q* and r* are then used to find indications in constellation matrix M1 of memory 40, which in turn choose 7-bit PAM code words in PAM code memory as described above.

With the provided remapping algorithm, it will be appreciated that as all quotients are increased by the value one, the quotient 00 is not utilized unless a complete remapping is occurring, or unless the original quotient was a maximum (i.e., in this case, where values 90 00 and 90 01 were to be utilized as set forth in Table 2). Thus, on the receiving end, a demapper will be informed that the remapping algorithm is being utilized when it receives a quotient equal to zero and a remainder greater than a threshold value based on the equation. In this case, the remapping would be recognized where the received quotient was zero, and the remainder is greater than 01 (as 00 00 and 00 01 are reserved for the original determinations of 90 00 and 90 01). Also, it should be appreciated that the threshold value or values (e.g., eighty-two) are chosen so that the number of possible combinations with both values above the threshold (in this case sixty-four=8×8), is equal to or less than the number of combinations available where q* is set to zero (in this case eighty-nine; e.g., 00 02 through 00 90). Further, it will be appreciated that the equation used to find the modified remainder preferably sets k2 equal to the number of quotient levels replaced (in this case, eight), while k1 is chosen so that the equation requires that when q* equals zero, r* will be greater than otherwise reserved values (in this case 00 00 and 00 01). Thus, with the equation $r^*=804-r-8(q)$, r* will always be equal to two or more, as the maximum absolute value that $-r-8(q)$ can equal is 802 (where q=89 and r=90).

Turning now to FIG. 4 in conjunction with Appendix 3 and Table 3, a second embodiment of the invention is seen. The mapper 136 of FIG. 4 is substantially identical to the mapper 36 of FIG. 2 (with similar elements indicated with similar designation numerals increased by 100), and includes a constellation matrix memory 140, a PAM code memory 150 (as part of a code generation means 168), a logic block 160 for arranging data, a constellation controller 165 coupled to the constellation matrix memory 140 for selecting a constellation from the constellation matrix memory, an address computation block 170 (as part of the code generation means 168) which is coupled to the logic block 160 and to the constellation matrix memory 140 and the PAM code memory 150, and an output register 175. According to the second embodiment of the invention, the constellation matrix memory 140 stores indications of n constellations, including constellations of different dimensions. In the preferred embodiment of FIG. 4, n=18; i.e., indications of eighteen constellations are stored in eighteen 8×16 bit memory blocks, and the eighteen constellations (as shown in Appendix 3) represent 1D, 2D, 3D 4D, 6D and 8D constellations. With indications of 8D constellations stored in the constellation matrix memory 140, it will be appreciated that the output register 175 must be able to accommodate eight eight-bit output symbols; i.e., the output register 175 contains at least sixty-four bits. it will be also be appreciated that when using an 8D constellation, eight bits from a large group are first used as sign bits before the remainder of the bits are used to choose eight constellation points as discussed in more detail below.

As seen in Table 3, according to the second embodiment of the invention, different bit rates (with different steps) may be obtained using different constellations, or constellation combinations which provide certain minimum distances, certain probabilities $F_{min}$ of points having the minimum distances, and different powers. The minimum size frame shown is dependent on the dimension of the constellation, the number of constellations used to obtain the desired bit rate, and ratio of frequency of the different constellations utilized. Thus, for example, in accord with the second embodiment of the invention, in order to obtain a bit rate of 57.5 kbps with a minimum distance of 8, as one preferred option, a sixteen symbol frame utilizing the two-dimensional 182-point constellation of Appendix 3 three times, and the one-dimensional 128-point constellation of Appendix 3 ten times (thereby obtaining a $F_{min}$ of 0.10 and a power of −10.9 dBm) can be provided. As a second preferred option, three utilizations of a four-dimensional 154-point constellation (to obtain twelve symbols) can be interspersed with four utilizations of the one-dimensional 128-point constellation of Appendix 3 (thereby obtaining a $F_{min}$ of 0.13, but a power of −12.0 dBm). Whenever a 1D constellation is utilized, the grouped bits can be used to directly choose a point in the constellation. However, where the 2D constellation is utilized (in this example), as discussed above with respect to the first embodiment of the invention, thirteen bits are used to choose two points of the 182-point 2D constellation by dividing $2^{13}$ by the ninety-one, and using the quotient to select a first point and a remainder to select a second point. Where the 4D constellation is utilized, in this example, twenty-nine bits are grouped together, with a subgroup of four bits used as signed bits and another subgroup of twenty-five bits used to select four points of the 154-point 4D constellation. According to the invention, the value of the twenty-five bits is divided by $77^3$ to provide a quotient which is used to select a first indication (positive point). The remainder of the division is then divided by $77^2$ to provide a second quotient which is used to select a second indication. The resulting remainder is then divided by 77 to provide a third quotient which is used to select a third indication, and a remainder which is used to select a fourth indication. As suggested above, all four constellation indications are then used either to select locations in the PAM code memory, with the values in the selected locations of the PAM code memory are used provide seven-bit outputs, or to directly generate four seven-bit outputs, which are sent to the output register.

Given the above discussion, it will be appreciated that the method for choosing constellation points in a multidimensional constellation may be broadly stated as follows. First, for an N-dimensional constellation, x bits are grouped together (where $2^{x-N} 21 L^N$ with L=the number of positive points in the constellation). A subgroup of N bits of the x bits are used as the sign bits for the N output symbols. The digital value represented by a subgroup of the x−N remaining bits is then divided by $L^{N-m}$ (where m is a variable which takes values from 1 to N−1 sequentially) to obtain quotients and remainders. The first quotient is used to select a first constellation point value (indication) which is used to generate a code value output. If N−m equals one, the first remainder is used to select another constellation point indication. However, if N−m is greater than one, m is increased by one, and the remainder is divided by $L^{N-m}$ to obtain a second quotient and a second remainder, with the second quotient being used to select a second constellation point value. If N−m is equal to one, the second remainder is used to select a third constellation point value; otherwise, m is again increased and the remainder divided by $L^{N-m}$. The process is continued until N−m equals one, and the last remainder is used to select the N'th constellation point value.

Through the use of 2D, 3D, 4D, 6D, and 8D constellations alone, or in conjunction with each other and in conjunction with 1D constellations, as seen in Table 3, many different bit rates can be obtained while maintaining desirable minimum distances and power. It should be noted that Table 3 sets forth the use of all eighteen of the constellations seen in Appendix 3, including the 182-point 2D constellation, the 162-point 3D constellation, the 154-point 4D constellation, the 144-point 6D constellation, the 140-point 8D constellation, the 128-point 1D constellation, the 114-point 6D constellation, 108-point 4D constellation, the 100-point 8D constellation, the 92-point 2D constellation, the 82-point 3D constellation, the 78-point 4D constellation, the 72-point 6D constellation, the 64-point 1D constellation, the 54-point 4D constellation, the 46-point 2D constellation, the 38-point 4D constellation, and the 32 point 1D constellation. It will also be appreciated, that by utilizing constellations of even higher dimension, additional gain may be obtained, albeit at the expense of more complex calculations.

It should be appreciated by those skilled in the art, that according to the presently preferred embodiment of the invention, the concepts of remapping in order to reduce power or permit higher minimum distances at the same power can be utilized in conjunction with higher dimension constellations as well as with respect to a 2D constellation. Thus, for example, the 4D fifty-four point (twenty-seven positive and twenty-seven negative points) constellation shown in Table 3 for generating a 46 kbps signal can be remapped by finding three quotients and a remainder according to the algorithm just described, and using any two of the quotients, or one of the quotients and the remainder according to the remapping algorithm broadly set forth above with respect to FIG. 2. Thus, for example, the first quotient can be used as the quotient q and the second quotient as the remainder r. Then, according to the remapping algorithm, the address computation block 170 would increase the value of q by 1, and determine whether q+1 and r are both greater than twenty-three. If q+1 or r are less than or equal to twenty-three, q+1 would be used to choose a first indication in the 4D constellation, and r would be used to choose a second indication. If q+1 and r are both more than twenty-three, q+1=q* is set to 00 and used to choose the first indication in the 4D constellation, while r*=119−r−3q would be used to choose a second indication.

Those skilled in the art will appreciate that demappers according to the invention use techniques corresponding substantially to the opposite of the mapping techniques.

There have been described and illustrated herein apparatus and methods for the mapping of data in a high data rate modem. While particular embodiments of the invention have been described, it is not intended that the invention be limited exactly thereto, as it is intended that the invention be as broad in scope as the art will permit. Thus, while the invention has been described with respect to certain hardware, it will be appreciated that various functions can be carried in different hardware and/or software. Indeed, the invention has application to both analog and digital transport types of modems. In addition, while particular constellations and particular numbers of constellations being stored in constellation matrix memory were described as being preferred, it will be appreciated that other, and different numbers of constellations could be utilized. Similarly, different code, such as A-law, can be stored in the PAM code memory, and even where the PAM code relates to $\mu$-law, depending upon the constellations, it is possible to include only certain 7-bit words which are necessary for those constellations in the PAM code memory. In fact, rather than storing PAM code memory, depending upon the application, it may be possible to store PAM code values. Further, while the apparatus and methods of the invention are described as effectively using up to a sixteen symbol frame to provide the ability to choose bit rates with a step of 0.5 kbps, it will be appreciated that with different size frames, different steps could be generated. For example, finer steps (e.g., .25 kbps) can be generated with larger frames (e.g., thirty-two symbols), larger steps with smaller frames, and other different steps (e.g., $2/3$ kbps) with different size frames (e.g., twelve symbols). Further, while the invention was described as enabling bit rates of up to 60 kbps using the fifteen-bit symbol pairs (i.e., 2D constellations), it will be appreciated that by using constellations of higher dimension, even higher rates can be obtained. Also, while the invention was described with respect to certain remapping algorithms which are used to reduce power, it will be appreciated that other power reducing remapping algorithms could be utilized. Therefore, it will be apparent to those skilled in the art that other changes and modifications may be made to the invention as described in the specification without departing from the spirit and scope of the invention as so claimed.

APPENDIX 1

μ-law code (full constellation)

| Sector # | Level # | Level Value | Code 12345678 | Negative Levels | Code 12345678 |
|---|---|---|---|---|---|
| 8 | 127 | 8031 | 10000000 | −8031 | 00000000 |
| 8 | 126 | 7775 | 10000001 | | |
| 8 | 125 | 7519 | 10000010 | | |
| 8 | 124 | 7263 | 10000011 | | |
| 8 | 123 | 7007 | 10000100 | | |
| 8 | 122 | 6751 | 10000101 | | |
| 8 | 121 | 6495 | 10000110 | | |
| 8 | 120 | 6239 | 10000111 | | |
| 8 | 119 | 5983 | 10001000 | | |
| 8 | 118 | 5727 | 10001001 | | |
| 8 | 117 | 5471 | 10001010 | | |
| 8 | 116 | 5215 | 10001011 | | |
| 8 | 115 | 4959 | 10001100 | | |
| 8 | 114 | 4703 | 10001101 | | |
| 8 | 113 | 4447 | 10001110 | | |
| 8 | 112 | 4191 | 10001111 | −4191 | 00001111 |
| 7 | 111 | 3999 | 10010000 | −3999 | 00010000 |
| 7 | 110 | 3871 | 10010001 | | |
| 7 | 109 | 3747 | 10010010 | | |
| 7 | 108 | 3615 | 10010011 | | |
| 7 | 107 | 3487 | 10010100 | | |
| 7 | 106 | 3359 | 10010101 | | |
| 7 | 105 | 3231 | 10010110 | | |
| 7 | 104 | 3103 | 10010111 | | |
| 7 | 103 | 2975 | 10011000 | | |
| 7 | 102 | 2847 | 10011001 | | |
| 7 | 101 | 2719 | 10011010 | | |
| 7 | 100 | 2591 | 10011011 | | |
| 7 | 99 | 2463 | 10011100 | | |
| 7 | 98 | 2335 | 10011101 | | |
| 7 | 97 | 2207 | 10011110 | | |
| 7 | 96 | 2079 | 10011111 | −2079 | 00011111 |
| 6 | 95 | 1983 | 10100000 | −1983 | 00100000 |
| 6 | 94 | 1919 | 10100001 | | |
| 6 | 93 | 1855 | 10100010 | | |
| 6 | 92 | 1791 | 10100011 | | |
| 6 | 91 | 1727 | 10100100 | | |
| 6 | 90 | 1663 | 10100101 | | |
| 6 | 89 | 1599 | 10100110 | | |
| 6 | 88 | 1535 | 10100111 | | |
| 6 | 87 | 1471 | 10101000 | | |
| 6 | 86 | 1407 | 10101001 | | |
| 6 | 85 | 1343 | 10101010 | | |
| 6 | 84 | 1279 | 10101011 | | |
| 6 | 83 | 1215 | 10101100 | | |
| 6 | 82 | 1151 | 10101101 | | |
| 6 | 81 | 1087 | 10101110 | | |
| 6 | 80 | 1023 | 10101111 | −1023 | 00101111 |
| 5 | 79 | 975 | 10110000 | −975 | 00110000 |
| 5 | 78 | 943 | 10110001 | | |
| 5 | 77 | 911 | 10110000 | | |
| 5 | 76 | 879 | 10110011 | | |
| 5 | 75 | 847 | 10110100 | | |
| 5 | 74 | 815 | 10110101 | | |
| 5 | 73 | 783 | 10110110 | | |
| 5 | 72 | 751 | 10110111 | | |
| 5 | 71 | 719 | 10111000 | | |
| 5 | 70 | 687 | 10111001 | | |
| 5 | 69 | 655 | 10111010 | | |

APPENDIX 1-continued

μ-law code (full constellation)

| Sector # | Level # | Level Value | Code 12345678 | Negative Levels | Code 12345678 |
|---|---|---|---|---|---|
| 5 | 68 | 623 | 10111011 | | |
| 5 | 67 | 591 | 10111100 | | |
| 5 | 66 | 559 | 10111101 | | |
| 5 | 65 | 527 | 10111110 | | |
| 5 | 64 | 495 | 10111111 | −495 | 00111111 |
| 4 | 63 | 471 | 11000000 | −471 | 01000000 |
| 4 | 62 | 455 | 11000001 | | |
| 4 | 61 | 439 | 11000010 | | |
| 4 | 60 | 423 | 11000011 | | |
| 4 | 59 | 407 | 11000100 | | |
| 4 | 58 | 391 | 11000101 | | |
| 4 | 57 | 375 | 11000110 | | |
| 4 | 56 | 359 | 11000111 | | |
| 4 | 55 | 343 | 11001000 | | |
| 4 | 54 | 327 | 11001001 | | |
| 4 | 53 | 311 | 11001010 | | |
| 4 | 52 | 295 | 11001011 | | |
| 4 | 51 | 279 | 11001100 | | |
| 4 | 50 | 263 | 11001101 | | |
| 4 | 49 | 247 | 11001110 | | |
| 4 | 48 | 231 | 11001111 | −231 | 01001111 |
| 3 | 47 | 219 | 11010000 | −219 | 01010000 |
| 3 | 46 | 211 | 11010001 | | |
| 3 | 45 | 203 | 11010010 | | |
| 3 | 44 | 195 | 11010011 | | |
| 3 | 43 | 187 | 11010100 | | |
| 3 | 42 | 179 | 11010101 | | |
| 3 | 41 | 171 | 11010110 | | |
| 3 | 40 | 163 | 11010111 | | |
| 3 | 39 | 155 | 11001100 | | |
| 3 | 38 | 147 | 11011000 | | |
| 3 | 37 | 139 | 11011010 | | |
| 3 | 36 | 131 | 11011011 | | |
| 3 | 35 | 123 | 11011100 | | |
| 3 | 34 | 115 | 11011101 | | |
| 3 | 33 | 107 | 11011110 | | |
| 3 | 32 | 99 | 11011111 | −99 | 01011111 |
| 2 | 31 | 93 | 11100000 | −93 | 01100000 |
| 2 | 30 | 89 | 11100001 | | |
| 2 | 29 | 85 | 11100010 | | |
| 2 | 28 | 81 | 11100011 | | |
| 2 | 27 | 77 | 11100100 | | |
| 2 | 26 | 73 | 11100101 | | |
| 2 | 25 | 69 | 11100110 | | |
| 2 | 24 | 65 | 11100111 | | |
| 2 | 23 | 61 | 11101000 | | |
| 2 | 22 | 57 | 11101001 | | |
| 2 | 21 | 53 | 11101010 | | |
| 2 | 20 | 49 | 11101011 | | |
| 2 | 19 | 45 | 11101100 | | |
| 2 | 18 | 41 | 11101101 | | |
| 2 | 17 | 37 | 11101110 | | |
| 2 | 16 | 33 | 11101111 | −33 | 01101111 |
| 1 | 15 | 30 | 11110000 | −30 | 01110000 |
| 1 | 14 | 29 | 11110001 | | |
| 1 | 13 | 26 | 11110010 | | |
| 1 | 12 | 24 | 11110011 | | |
| 1 | 11 | 22 | 11110100 | | |
| 1 | 10 | 20 | 11110101 | | |
| 1 | 9 | 18 | 11110110 | | |
| 1 | 8 | 16 | 11110111 | | |
| 1 | 7 | 14 | 11111000 | | |
| 1 | 6 | 12 | 11111001 | | |
| 1 | 5 | 10 | 11111010 | | |
| 1 | 4 | 8 | 11111011 | | |
| 1 | 3 | 6 | 11111100 | | |
| 1 | 2 | 4 | 11111101 | | |
| 1 | 1 | 2 | 11111110 | −2 | 01111110 |
| 1 | 0 | 0 | 11111111 | 0 | 11111111 |

APPENDIX 2

PAM CONSTELLATIONS 1. 182 point 2D Constellation for
7.5 bit per symbol, $D_{min}$ = 8 (50 points), P = 8.7 dBm $S_1$ = [0,0,1,0,0,0,1,0,0,0,1,0,0,0,1,0];
$S_2$ = [0,1,0,1,0,1,0,1,0,1,0,1,0,1,0,1];
$S_3$ = [0,1,1,1,1,1,1,1,1,1,1,1,1,1,1,1];
$S_4$ = [1,1,1,1,1,1,1,1,1,1,1,1,1,1,1,1];
$S_5$ = [1,1,1,1,1,1,1,1,1,1,1,1,1,1,1,1];
$S_6$ = [1,1,1,1,1,1,1,1,1,1,1,1,1,1,1,1];
$S_7$ = [1,1,1,1,1,1,1,1,1,1,1,1,1,1,1,1];
$S_8$ = [0,0,0,0,0,0,0,0,0,0,0,0,0,0,0,0];

2. 128 point 1D Constellation for
7 bit per symbol: $D_{min}$ = 16 (46 points), P = -12.1 dBm $S_1$ = [0,0,0,0,0,1,0,0,0,0,0,0,0,1,0];
$S_2$ = [0,0,0,1,0,0,0,0,1,0,0,0,1,0,0,0];
$S_3$ = [1,0,1,0,1,0,1,0,1,0,1,0,1,0,1,0];
$S_4$ = [1,1,1,1,1,1,1,1,1,1,1,1,1,1,1,1];
$S_5$ = [1,1,1,1,1,1,1,1,1,1,1,1,1,1,1,1];
$S_6$ = [1,1,1,1,1,1,1,1,1,1,1,1,1,1,1,1];
$S_7$ = [1,1,1,1,1,1,1,1,1,1,1,1,1,1,1,1];
$S_8$ = [0,0,0,0,0,0,0,0,0,0,0,0,0,0,0,0];

3. 64-point 1D Constellation for
6 bit per symbol: $D_{min}$ = 36 (6 points), P = -12.2 dBm $S_1$ = [0,0,0,0,0,0,0,0,1,0,0,0,0,0];
$S_2$ = [0,0,0,0,0,1,0,0,0,0,0,0,0,1];
$S_3$ = [0,0,1,0,0,0,0,0,1,0,0,0,1,0];
$S_4$ = [0,1,0,0,1,0,0,0,1,0,0,1,0,0];
$S_5$ = [1,0,1,0,1,0,1,0,1,0,1,0,1,0];
$S_6$ = [1,1,1,1,1,1,1,1,1,1,1,0,0,0];
$S_7$ = [0,0,0,0,0,0,0,0,0,0,0,0,0,0];
$S_8$ = [0,0,0,0,0,0,0,0,0,0,0,0,0,0];

4. 32-point 1D Constellation for
5 bit per symbol: $D_{min}$ = 96 (8 points), P = -12.1 dBm $S_1$ = [0,0,0,0,0,0,0,0,0,0,0,0,0,0];
$S_2$ = [0,0,0,0,1,0,0,0,0,0,0,0,0,0];
$S_3$ = [0,0,0,0,0,0,1,0,0,0,0,0,0,0];
$S_4$ = [0,1,0,0,0,0,0,0,1,0,0,0,0,1];
$S_5$ = [0,0,0,1,0,0,1,0,0,1,0,0,1,1];
$S_6$ = [0,1,0,1,0,1,0,1,0,1,0,0,0,0];
$S_7$ = [0,0,0,0,0,0,0,0,0,0,0,0,0,0];
$S_8$ = [0,0,0,0,0,0,0,0,0,0,0,0,0,0];

APPENDIX 3

PAM CONSTELLATIONS 1. 182-point 2D Constellation for
7.5 bit per symbol, Dmin = 8 (50 points = 0,27), P = 8.7 dBm z1 = [0,0,1,0,0,0,1,0,0,0,1,0,0,0,1,0];
z2 = [0,1,0,1,0,1,0,1,0,1,0,1,0,1,0,1];
z3 = [0,1,1,1,1,1,1,1,1,1,1,1,1,1,1,1];
z4 = [1,1,1,1,1,1,1,1,1,1,1,1,1,1,1,1];
z5 = [1,1,1,1,1,1,1,1,1,1,1,1,1,1,1,1];
z6 = [1,1,1,1,1,1,1,1,1,1,1,1,1,1,1,1];
z7 = [1,1,1,1,1,1,1,1,1,1,1,1,1,1,1,1];
z8 = [0,0,0,0,0,0,0,0,0,0,0,0,0,0,0,0];

2. 154-point 4D Constellation for
7.25 bit per symbol, Dmin = 8 (26 points = 0.17), P = -12.0 dBm $S_1$ = [0,0,0,1,0,0,0,0,1,0,0,0,0,1,0,0];
$S_2$ = [0,1,0,0,1,0,0,1,0,0,1,0,0,1,0,0];
$S_3$ = [1,1,1,1,1,1,1,1,1,1,1,1,1,0,0,1];
$S_4$ = [1,1,1,1,1,1,1,1,1,1,1,1,1,1,1,1];
$S_5$ = [1,1,1,1,1,1,1,1,1,1,1,1,1,1,1,1];
$S_6$ = [1,1,1,1,1,1,1,1,1,1,1,1,1,1,1,1];
$S_7$ = [1,1,1,1,1,1,0,0,0,0,0,0,0,0,0,0];
$S_8$ = [0,0,0,0,0,0,0,0,0,0,0,0,0,0,0,0];

APPENDIX 3-continued

PAM CONSTELLATIONS 3. 128-point 1D Constellation for
7 bit per symbol: $D_{min}$ = 16 (46 points = 036), P = -12.1 dBm $S_1$ = [0,0,0,0,0,1,0,0,0,0,0,0,0,0,1,0];
$S_2$ = [0,0,0,1,0,0,0,0,0,1,0,0,0,1,0,0,0];
$S_3$ = [1,0,1,0,1,0,1,0,1,0,1,0,1,0,1,0];
$S_4$ = [1,1,1,1,1,1,1,1,1,1,1,1,1,1,1,1];
$S_5$ = [1,1,1,1,1,1,1,1,1,1,1,1,1,1,1,1];
$S_6$ = [1,1,1,1,1,1,1,1,1,1,1,1,1,1,1,1];
$S_7$ = [1,1,1,0,0,0,0,0,0,0,0,0,0,0,0,0];
$S_8$ = [0,0,0,0,0,0,0,0,0,0,0,0,0,0,0,0];

4. 108 4D Constellation for
6.75 bit per symbol: Dmin = 16 (12 points = 0.11), P = -11.9 dBm $S_1$ = [0,0,0,0,1,0,0,0,0,0,0,1,0,0,0];
$S_2$ = [0,0,1,0,0,0,1,0,0,0,1,0,0,0,1,0];
$S_3$ = [0,1,0,1,0,0,1,0,0,0,1,0,0,0,0,1];
$S_4$ = [0,1,0,1,0,1,0,1,0,1,0,1,0,1];
$S_5$ = [1,1,1,1,1,1,1,1,1,1,1,1,1,1,1,1];
$S_6$ = [1,1,1,1,1,1,1,1,1,1,1,1,1,1,1,1];
$S_7$ = [1,1,0,0,0,0,0,0,0,0,0,0,0,0,0,0];
$S_8$ = [0,0,0,0,0,0,0,0,0,0,0,0,0,0,0,0];

5. 92-point 2D Constellation for
6.5 bit per symbol, Dmin = 32 (54 points = 0.58), P = -12.0 dBm $S_1$ = [0,0,0,0,0,0,0,0,1,0,0,0,0,0,0];
$S_2$ = [0,0,0,0,1,0,0,0,0,0,0,1,0,0,0];
$S_3$ = [0,0,1,0,0,0,1,0,0,0,1,0,0,0,1,0];
$S_4$ = [0,1,0,1,0,1,0,1,0,1,0,1,0,1,0,1];
$S_5$ = [0,1,1,1,1,1,1,1,1,1,1,1,1,1,1,1];
$S_6$ = [1,1,1,1,1,1,1,1,1,1,1,1,1,1,1,1];
$S_7$ = [0,0,0,0,0,0,0,0,0,0,0,0,0,0,0,0];
$S_8$ = [0,0,0,0,0,0,0,0,0,0,0,0,0,0,0,0];

6. 78-point 4D Constellation for
6.25 bit per symbol, Dmin = 32 (20 points = 0.26), P = -12.0 dBm h1 = [0,0,0,0,0,0,0,0,0,1,0,0,0,0,0];
h2 = [0,0,0,0,0,0,0,1,0,0,0,0,0,0,0,0];
h3 = [0,1,0,0,0,0,1,0,0,0,0,1,0,0,0,0];
h4 = [1,0,0,1,0,0,1,0,0,1,0,0,1,0,0,1];
h5 = [0,1,1,1,1,1,1,1,1,1,1,1,1,0,1,0,1];
h6 = [1,1,1,1,1,1,1,1,1,1,1,1,1,1,1,0];
h7 = [0,0,0,0,0,0,0,0,0,0,0,0,0,0,0,0];
h8 = [0,0,0,0,0,0,0,0,0,0,0,0,0,0,0,0];

7. 64-point 1D Constellation for
6 bit per symbol: $D_{min}$ = 36 (6 points = 0.09), P = 12.2 dBm $S_1$ = [0,0,0,0,0,0,0,0,0,1,0,0,0,0,0,0];
$S_2$ = [0,0,0,0,0,0,1,0,0,0,0,0,0,0,0,1];
$S_3$ = [0,0,0,0,0,1,0,0,0,0,1,0,0,0,0,1,0];
$S_4$ = [0,1,0,0,1,0,0,0,1,0,0,1,0,0,1];
$S_5$ = [1,0,1,0,1,0,1,0,1,0,1,0,1,0];
$S_6$ = [1,1,1,1,1,1,1,1,1,1,1,1,0,0,0];
$S_7$ = [0,0,0,0,0,0,0,0,0,0,0,0,0,0,0,0];
$S_8$ = [0,0,0,0,0,0,0,0,0,0,0,0,0,0,0,0];

8. 54-point 4D Constellation for
5.75 bit per symbol: Dmin = 60 (4 points = 0.07), P = -11.9 dBm h1 = [0,0,0,0,0,0,0,0,0,0,0,0,0,0,1];
h2 = [0,0,0,0,0,0,0,0,0,0,0,0,0,0,0,1];
h3 = [0,0,0,0,0,0,1,0,0,0,0,0,0,0,0,1];
h4 = [0,0,0,1,0,0,0,1,0,0,0,1,0,0,0,1];
h5 = [0,0,1,0,1,0,1,0,1,0,1,0,1,0,1,0];
h6 = [1,1,1,1,1,1,1,1,1,1,1,1,0,0,0,0];
h7 = [0,0,0,0,0,0,0,0,0,0,0,0,0,0,0,0];
h8 = [0,0,0,0,0,0,0,0,0,0,0,0,0,0,0,0];

9. 46-point 2D Constellation for
5.5 bit per symbol, Dmin = 64 (16 points = 0.36), P = -12.0 dBm z1 = [0,0,0,0,0,0,0,0,0,0,0,0,0,0,0];
z2 = [1,0,0,0,0,0,0,0,0,0,0,0,0,0,0];
z3 = [1,0,0,0,0,0,0,0,0,0,0,0,0,0,0];
z4 = [0,1,0,0,0,1,0,0,0,0,1,0,0,0,1,0];
z5 = [0,1,0,1,0,1,0,1,0,1,0,1,0,1];
z6 = [0,1,0,1,0,1,0,1,0,1,0,1,0,1];
z7 = [0,0,0,0,0,0,0,0,0,0,0,0,0,0,0,0];
z8 = [0,0,0,0,0,0,0,0,0,0,0,0,0,0,0,0];

APPENDIX 3-continued
PAM CONSTELLATIONS 10. 38-point 4D Constellation for
5.25 bit per symbol: Dmin = 72 (4 points = 0.11), P = −12.0 dBm $z1$ = [0,0,0,0,0,0,0,0,0,0,0,0,0,0,0,0];
$z2$ = [0,1,0,0,0,0,0,0,0,0,0,0,0,0,0,0];
$z3$ = [0,0,1,0,0,0,0,0,0,0,0,1,0,0,0,0];
$z4$ = [0,0,1,0,0,0,0,1,0,0,0,0,1,0,0,0];
$z5$ = [1,0,0,1,0,0,1,0,0,1,0,0,1,0,0,1];
$z6$ = [0,1,0,1,0,1,0,1,0,1,0,1,0,1,0,0];
$z7$ = [0,0,0,0,0,0,0,0,0,0,0,0,0,0,0,0];
$z8$ = [0,0,0,0,0,0,0,0,0,0,0,0,0,0,0,0];

11. 32-point 1D Constellation for
5 bit per symbol: $D_{min}$ = 96 (8 points = 0.25), P = −12.1 dBm $z1$ = [0,0,0,0,0,0,0,0,0,0,0,0,0,0,0,0];
$z2$ = [0,0,0,0,0,1,0,0,0,0,0,0,0,0,0,0];
$z3$ = [0,0,0,0,0,0,1,0,0,0,0,0,0,0,0,0];
$z4$ = [0,1,0,0,0,0,0,0,1,0,0,0,0,0,0,1];
$z5$ = [0,0,0,1,0,0,1,0,0,1,0,0,1,0,0,1];
$z6$ = [0,1,0,1,0,1,0,1,0,1,0,1,0,0,0,0];
$z7$ = [0,0,0,0,0,0,0,0,0,0,0,0,0,0,0,0];
$z8$ = [0,0,0,0,0,0,0,0,0,0,0,0,0,0,0,0];

12. 140-point 8D constellation for
7.5 bit per symbol, Dmin = 12 (16 points = 0.11), P = 11.3 dBm $z1$ = [0,0,0,1,0,0,0,0,0,1,0,0,0,0,0,1];
$z2$ = [0,0,0,1,0,0,1,0,0,1,0,0,0,1,0,1];
$z3$ = [0,1,0,1,0,1,0,1,0,1,0,1,0,1,0,1];
$z4$ = [1,1,1,1,1,1,1,1,1,1,1,1,1,1,1,1];
$z5$ = [1,1,1,1,1,1,1,1,1,1,1,1,1,1,1,1];
$z6$ = [1,1,1,1,1,1,1,1,1,1,1,1,1,1,1,1];
$z7$ = [1,1,1,1,1,1,0,0,0,0,0,0,0,0,0,0];
$z8$ = [0,0,0,0,0,0,0,0,0,0,0,0,0,0,0,0];

12. 140-point 8D constellation for
7.5 bit per symbol, Dmin = 12 (16 points = 0.11), P = 11.3 dBm $z1$ = [0,0,0,1,0,0,0,0,0,1,0,0,0,0,0,1];
$z2$ = [0,0,0,1,0,0,1,0,0,1,0,0,1,0,0,1];
$z3$ = [0,1,0,1,0,1,0,1,0,1,0,1,0,1,0,1];
$z4$ = [1,1,1,1,1,1,1,1,1,1,1,1,1,1,1,1];
$z5$ = [1,1,1,1,1,1,1,1,1,1,1,1,1,1,1,1];
$z6$ = [1,1,1,1,1,1,1,1,1,1,1,1,1,1,1,1];
$z7$ = [1,1,1,1,1,1,0,0,0,0,0,0,0,0,0,0];
$z8$ = [0,0,0,0,0,0,0,0,0,0,0,0,0,0,0,0];

13. 100-point 8D constellation for
6.625 bit per symbol (53 kbps): Dmin 24 (16 points = 0.16), P = −11.9 dBm $h1$ = [0,0,0,0,0,0,1,0,0,0,0,0,0,0,0,0];
$h2$ = [0,1,0,0,0,0,0,1,0,0,0,0,0,1,0,0];
$h3$ = [0,0,1,0,0,1,0,0,1,0,0,1,0,1,1,0];
$h4$ = [0,1,0,1,0,1,0,1,0,1,0,1,0,1,0,1];
$h5$ = [1,1,1,1,1,1,1,1,1,1,1,1,1,1,1,1];
$h6$ = [1,1,1,1,1,1,1,1,1,1,1,1,1,1,1,1];
$h7$ = [1,0,0,0,0,0,0,0,0,0,0,0,0,0,0,0];
$h8$ = [0,0,0,0,0,0,0,0,0,0,0,0,0,0,0,0];

14. 162-point 3D constellation for
7.333 bit per symbol (58.667 kbps), Dmin = 8 (50 points = 0.31), P = 12.0 dBm $z1$ = [0,0,1,0,0,0,1,0,0,0,1,0,0,0,1,0];
$z2$ = [0,1,0,1,0,1,0,1,0,1,0,1,0,1,0,1];
$z3$ = [0,1,1,1,1,1,1,1,1,1,1,1,1,1,1,1];
$z4$ = [1,1,1,1,1,1,1,1,1,1,1,1,1,1,1,1];
$z5$ = [1,1,1,1,1,1,1,1,1,1,1,1,1,1,1,1];
$z6$ = [1,1,1,1,1,1,1,1,1,1,1,1,1,1,1,1];
$z7$ = [1,1,1,1,1,1,0,0,0,0,0,0,0,0,0,0];
$z8$ = [0,0,0,0,0,0,0,0,0,0,0,0,0,0,0,0];

APPENDIX 3-continued
PAM CONSTELLATIONS 15. 144-point 6D constellation for
7.1666 bit per symbol (57.333), Dmin = 8 (14 points = 0.10), P = −12.2 dBm $h1$ = [0,0,0,1,0,0,0,0,1,0,0,0,0,1,0,0];
$h2$ = [0,1,0,0,1,0,0,1,0,0,1,0,0,1,0,0];
$h3$ = [1,1,1,1,1,1,1,1,0,1,0,1,0,1,0,1];
$h4$ = [1,1,1,1,1,1,1,1,1,1,1,1,1,1,1,1];
$h5$ = [1,1,1,1,1,1,1,1,1,1,1,1,1,1,1,1];
$h6$ = [1,1,1,1,1,1,1,1,1,1,1,1,1,1,1,1];
$h7$ = [1,1,1,1,0,0,0,0,0,0,0,0,0,0,0,0];
$h8$ = [0,0,0,0,0,0,0,0,0,0,0,0,0,0,0,0];

16. 72-point 6D constellation for
6.1666 bit per symbol (49.333 kbps), Dmin = (12 points = 0.17), P = −12.0 dBm $z1$ = [0,0,0,0,0,0,0,0,0,1,0,0,0,0,0,0];
$z2$ = [0,0,0,0,0,1,0,0,0,0,0,0,0,1,0,0];
$z3$ = [0,0,0,1,0,0,0,0,1,0,0,0,0,1,0,0];
$z4$ = [0,1,0,0,1,0,0,1,0,0,1,0,0,1,0,1];
$z5$ = [0,1,1,1,1,1,0,1,0,1,0,1,0,1,0,1];
$z6$ = [1,1,1,1,1,1,1,1,1,1,1,1,1,0,0];
$z7$ = [0,0,0,0,0,0,0,0,0,0,0,0,0,0,0,0];
$z8$ = [0,0,0,0,0,0,0,0,0,0,0,0,0,0,0,0];

17. 82-point 3D constellation for
6.3333 bit per symbol (50.667 kbps); Dmin = 32 (28 points = 0.34), P = −12.1 dBm $h1$ = [0,0,0,0,0,0,0,0,0,1,0,0,0,0,0,0];
$h2$ = [0,0,0,0,0,0,1,0,0,0,0,0,0,1,0,0];
$h3$ = [0,0,0,1,0,0,0,0,1,0,0,0,0,1,0,0];
$h4$ = [0,1,0,0,1,0,0,1,0,0,1,0,0,1,0,0];
$h5$ = [1,1,1,1,1,1,1,1,1,1,1,1,1,1,0,1];
$h6$ = [1,1,1,1,1,1,1,1,1,1,1,1,1,1,1,0];
$h7$ = [0,0,0,0,0,0,0,0,0,0,0,0,0,0,0,0];
$h8$ = [0,0,0,0,0,0,0,0,0,0,0,0,0,0,0,0];

18. 114-point 6D constellation for
6.8333 bit per symbol (54.667 kbps), Dmin = 16 (26 points = 0.23), P = −12.0 dBm $h1$ = [0,0,0,0,1,0,0,0,0,0,0,0,1,0,0,0];
$h2$ = [0,0,1,0,0,0,0,1,0,0,0,0,1,0,0,1,0];
$h3$ = [0,1,0,1,0,1,0,1,0,1,0,1,0,1,0,1];
$h4$ = [0,1,1,1,0,1,0,1,0,1,0,1,0,1,0,1];
$h5$ = [1,1,1,1,1,1,1,1,1,1,1,1,1,1,1,1];
$h6$ = [1,1,1,1,1,1,1,1,1,1,1,1,1,1,1,1];
$h7$ = [1,1,0,0,0,0,0,0,0,0,0,0,0,0,0,0];
$h8$ = [0,0,0,0,0,0,0,0,0,0,0,0,0,0,0,0];

TABLE 1

| Bit Rate kbps | Bit per Symbol | # of 15-bit pairs in the frame N1 | # of 7-bit symbols in the frame N2 | # of 6-bit symbols in the frame N3 | # of 5-bit symbols in the frame N4 | Basic PCM Constellations Size | $D_{min}$ | $F_{min}$ | PdBm |
|---|---|---|---|---|---|---|---|---|---|
| 60 | 7.5 | 8 | 0 | — | — | 182 | 8 | 0.27 | −8.7 |
| 59.5 | 7.4375 | 7 | 2 | — | — | 182/128 | " | 0.24 | −9.5 |
| 59 | 7.375 | 6 | 4 | — | — | " | " | 0.20 | −10.0 |
| 58.5 | 7.3125 | 5 | 6 | — | — | " | " | 0.17 | −10.5 |
| 58 | 7.25 | 4 | 8 | — | — | " | " | 0.14 | −10.9 |
| 57.5 | 7.1875 | 3 | 10 | — | — | " | " | 0.10 | −11.5 |
| 57 | 7.125 | 2 | 12 | — | — | " | " | 0.07 | −11.9 |
| 56.5 | 7.0625 | 1 | 14 | — | — | " | " | 0.03 | −12.1 |
| 56 | 7 | 0 | 16 | — | — | 128 | 16 | 0.36 | −12.1 |
| 55.5 | 6.9375 | — | 15 | 1 | — | 128/64 | 16 | 0.34 | −12.1 |
| 55 | 6.875 | — | 14 | 2 | — | " | " | 0.32 | −12.1 |
| 54.5 | 6.8125 | — | 13 | 3 | — | " | " | 0.29 | −12.1 |
| 54 | 6.75 | — | 12 | 4 | — | " | " | 0.27 | −12.1 |
| 53.5 | 6.6875 | — | 11 | 5 | — | " | " | 0.25 | −12.1 |
| 53 | 6.625 | — | 10 | 6 | — | " | " | 0.23 | −12.1 |
| 52.5 | 6.5625 | — | 9 | 7 | — | " | " | 0.20 | −12.1 |
| 52 | 6.5 | — | 8 | 8 | — | " | " | 0.18 | −12.1 |
| 51.5 | 6.4375 | — | 7 | 9 | — | " | " | 0.16 | −12.1 |
| 51 | 6.375 | — | 6 | 10 | — | " | " | 0.14 | −12.1 |
| 50.5 | 6.3125 | — | 5 | 11 | — | " | " | 0.12 | −12.1 |
| 50 | 6.25 | — | 4 | 12 | — | " | " | 0.09 | −12.1 |
| 49.5 | 6.1875 | — | 3 | 13 | — | " | " | 0.07 | −12.2 |
| 49 | 6.125 | — | 2 | 14 | — | " | " | 0.05 | −12.2 |
| 48.5 | 6.0625 | — | 1 | 15 | — | " | " | 0.02 | −12.2 |
| 48 | 6 | — | 0 | 16 | — | 64 | 36 | 0.09 | −12.2 |
| 47.5 | 5.9375 | — | — | 15 | 1 | 64/32 | 36 | 0.09 | −12.2 |
| 47 | 5.875 | — | — | 14 | 2 | " | " | 0.08 | −12.2 |
| 46.5 | 5.8125 | — | — | 13 | 3 | " | " | 0.08 | −12.2 |
| 46 | 5.75 | — | — | 12 | 4 | " | " | 0.07 | −12.2 |
| 45.5 | 5.6875 | — | — | 11 | 5 | " | " | 0.06 | −12.2 |
| 45 | 5.625 | — | — | 10 | 6 | " | " | 0.06 | −12.2 |
| 44.5 | 5.5625 | — | — | 9 | 7 | " | " | 0.05 | −12.2 |
| 44 | 5.5 | — | — | 8 | 8 | " | " | 0.05 | −12.1 |
| 43.5 | 5.4375 | — | — | 7 | 9 | " | " | 0.04 | −12.1 |
| 43 | 5.375 | — | — | 6 | 10 | " | " | 0.04 | −12.1 |
| 42.5 | 5.3125 | — | — | 5 | 11 | " | " | 0.03 | −12.1 |
| 42 | 5.25 | — | — | 4 | 12 | " | " | 0.03 | −12.1 |
| 41.5 | 5.1875 | — | — | 3 | 13 | " | " | 0.02 | −12.1 |
| 41 | 5.125 | — | — | 2 | 14 | " | " | 0.01 | −12.1 |
| 40.5 | 5.0625 | — | — | 1 | 15 | " | " | 0.01 | −12.1 |
| 40 | 5 | — | — | 0 | 16 | 32 | 96 | 0.25 | −12.1 |

TABLE 2

| 13-bit Binary Input Combinations | N - Decimal Number of the Input Combinations | N/91 (modulo 91) | Paris of 7-bit Output Combinations | Example of 8-bit Output Combinations (X & Y - sign digits) |
|---|---|---|---|---|
| 0000000000000 | 0 | 00 00 | $P_0 P_0$ | X1111101 Y1111101 |
| 0000000000001 | 1 | 00 01 | $P_0 P_1$ | X1111101 Y1111000 |
| 0000000000010 | 2 | 00 02 | $P_0 P_2$ | X1111101 Y1110011 |
| . | | | | |
| . | | | | |
| 0000001011010 | 90 | 00 90 | $P_0 P_{90}$ | X1111101 Y1111110 |
| 0000001011011 | 91 | 01 00 | $P_1 P_0$ | X1111000 Y1111101 |
| 0000001011100 | 92 | 01 01 | $P_1 P_1$ | X1111000 Y1111000 |
| . | | | | |
| . | | | | |
| 0000010110100 | 180 | 01 89 | $P_1 P_{89}$ | X1111000 Y0001111 |
| 0000010110101 | 181 | 01 90 | $P_1 P_{90}$ | X1111000 Y0001110 |
| 0000010110110 | 182 | 02 00 | $P_2 P_0$ | X1110011 Y1111101 |
| 0000010110111 | 183 | 02 01 | $P_2 P_1$ | X1110011 Y1111000 |
| . | | | | |
| 0000000010000 | 272 | 02 90 | $P_2 P_{90}$ | X1110011 Y0001110 |
| 0000000010001 | 273 | 03 00 | $P_3 P_0$ | X1110011 Y1111101 |

TABLE 2-continued

| 13-bit Binary Input Combinations | N - Decimal Number of the Input Combinations | N/91 (modulo 91) | Paris of 7-bit Output Combinations | Example of 8-bit Output Combinations (X & Y - sign digits) |
|---|---|---|---|---|
| 0000000010010 | 274 | 03 01 | $P_3$ $P_1$ | X1110011 Y1111000 |
| . | | | | |
| . | | | | |
| . | | | | |
| 1111111111101 | 8189 | 89 90 | $P_{89}$ $P_{90}$ | X0001111 10001110 |
| 1111111111110 | 8190 | 90 00 | $P_{90}$ $P_0$ | X0001110 11111101 |
| 1111111111111 | 8191 | 90 01 | $P_{90}$ $P_1$ | X0001110 11111000 |

TABLE 3

Mapping Parameters

| Bit Rate kbps | Bit per Symbol | Sequence of Constellations | Minimum Frame Size | Basic PAM Constellations Size | $D_{min}$ | $F_{min}$ | PdBm |
|---|---|---|---|---|---|---|---|
| 60 | 7.5 | 1 × 2D | 2 | 182 | 8 | 0.27 | −8.7 |
| 59.5 | 7.4375 | 7 × 2D + 2 × 1D | 16 | 182/128 | 8 | 0.24 | −9.0 |
| 59.5 | | 6 × 2D + 1 × 4D | 16 | 182/154 | 8 | 0.19 | −9.0 |
| 59 | 7.375 | 3 × 2D + 2 × 1D | 8 | 182/128 | 8 | 0.20 | −9.5 |
| 59 | | 2 × 2D + 1 × 4D | 8 | 182/154 | 8 | 0.18 | −10.0 |
| 58.667 | 7.3333 | 1 × 3D | 3 | 162 | 8 | 0.31 | −12.0 |
| 58.5 | 7.3125 | 5 × 2D + 6 × 1D | 16 | 182/128 | 8 | 0.17 | −10.0 |
| 58.5 | | 2 × 2D + 3 × 4D | 16 | 182/154 | 8 | 0.17 | −11.0 |
| 58 | 7.25 | 1 × 2D + 2 × 1D | 4 | 182/128 | 8 | 0.14 | −10.5 |
| 58 | | 1 × 4D | 4 | 154 | 8 | 0.17 | −12.0 |
| 57.5 | 7.1875 | 3 × 2D + 10 × 1D | 16 | 182/128 | 8 | 0.10 | −10.9 |
| 57.5 | | 3 × 4D + 4 × 1D | 16 | 154/128 | 8 | 0.13 | −12.0 |
| 57.333 | 7.1666 | 1 × 6D | 6 | 144 | 8 | 0.10 | −12.2 |
| 57 | 7.125 | 1 × 2D + 6 × 1D | 8 | 182/128 | 8 | 0.07 | −11.5 |
| 57 | | 1 × 4D + 4 × 1D | 8 | 154/128 | 8 | 0.09 | −12.1 |
| 56.5 | 7.0625 | 1 × 8D + 8 × 1D | 16 | 140/128 | 12 | 0.08 | −12.0 |
| 56 | 7.0 | 1 × 1D | 1 | 128 | 16 | 0.36 | −12.1 |
| 55.5 | 6.9375 | 1 × 4D + 12 × 1D | 16 | 128/108 | 16 | 0.30 | −12.1 |
| 55 | 6.875 | 1 × 4D + 4 × 1D | 8 | 128/108 | 16 | 0.23 | −12.1 |
| 54.667 | 6.8333 | 1 × 6D | 6 | 114 | 16 | 0.23 | −12.0 |
| 54.5 | 6.8125 | 3 × 4D + 4 × 1D | 16 | 128/108 | 16 | 0.17 | −12.0 |
| 54 | 6.75 | 1 × 4D | 4 | 108 | 16 | 0.11 | −11.9 |
| 54 | | 1 × 2D + 2 × 1D | 4 | 128/92 | 16 | 0.18 | −12.0 |
| 53.5 | 6.6875 | 11 × 1D + 5 × 1D | 16 | 128/64 | 16 | 0.25 | −12.1 |
| 53.5 | | 3 × 4D + 2 × 2D | 16 | 108/92 | 16 | 0.08 | −11.9 |
| 53 | 6.625 | 1 × 4D + 2 × 2D | 8 | 108/92 | 16 | 0.06 | −12.0 |
| 53 | | 1 × 8D | 8 | 100 | 24 | 0.16 | −11.9 |
| 52.5 | 6.5625 | 1 × 8D + 4 × 2D | 16 | 100/92 | 24 | 0.08 | −12.0 |
| 52 | 6.5 | 1 × 2D | 2 | 92 | 32 | 0.58 | −12.0 |
| 51.5 | 6.4376 | 1 × 4D + 6 × 2d | 16 | 92/78 | 32 | 0.50 | −12.0 |
| 51 | 6.375 | 1 × 4D + 2 × 2D | 8 | 92/78 | 32 | 0.42 | −12.0 |
| 50.667 | 6.3333 | 1 × 3D | 3 | 82 | 32 | 0.34 | −12.0 |
| 50.5 | 6.3125 | 3 × 4D + 2 × 2D | 16 | 92/78 | 32 | 0.34 | −12.0 |
| 50 | 6.25 | 1 × 4D | 4 | 78 | 32 | 0.26 | −12.0 |
| 49.5 | 6.1875 | 3 × 4D + 4 × 1D | 16 | 78/64 | 32 | 0.19 | −12.0 |
| 49.333 | 6.1666 | 1 × 6D | 6 | 72 | 32 | 0.17 | −12.0 |
| 49 | 6.125 | 1 × 4D + 4 × 1D | 8 | 78/64 | 32 | 0.13 | −12.1 |
| 48.5 | 6.0625 | 1 × 4D + 12 × 1D | 16 | 78/64 | 32 | 0.06 | −12.1 |
| 48 | 6 | 1 × 1D | 1 | 64 | 36 | 0.09 | −12.2 |
| 47.5 | 5.9375 | 1 × 4D + 12 × 1D | 16 | 64/54 | 36 | 0.07 | −12.1 |
| 47 | 5.875 | 1 × 4D + 4 × 1D | 8 | 64/54 | 36 | 0.05 | −12.0 |
| 46.5 | 5.8125 | 3 × 4D + 4 × 1D | 16 | 64/54 | 36 | 0.02 | −12.0 |
| 46 | 5.75 | 1 × 4D | 4 | 54 | 60 | 0.07 | −11.9 |
| 45.5 | 5.6875 | 3 × 4D + 2 × 2D | 16 | 54/46 | 60 | 0.05 | −12.0 |
| 45 | 5.625 | 1 × 4D + 2 × 2D | 8 | 54/46 | 60 | 0.04 | −12.0 |
| 44.5 | 5.5625 | 1 × 4D + 6 × 2D | 16 | 54/46 | 60 | 0.02 | −12.0 |
| 44 | 5.5 | 1 × 2D | 2 | 46 | 64 | 0.36 | −12.0 |
| 43.5 | 5.4375 | 1 × 4D + 6 × 2D | 16 | 46/38 | 64 | 0.27 | −12.0 |
| 43 | 5.375 | 1 × 4D + 2 × 2D | 8 | 46/38 | 64 | 0.18 | −12.0 |
| 42.5 | 5.3125 | 3 × 4D + 2 × 2D | 16 | 46/38 | 64 | 0.19 | −12.0 |
| 42 | 5.25 | 1 × 4D | 4 | 38 | 72 | 0.11 | −12.0 |
| 41.5 | 5.1875 | 3 × 4D + 4 × 1D | 16 | 38/32 | 72 | 0.11 | −12.0 |
| 41 | 5.125 | 1 × 4D + 4 × 1D | 8 | 38/32 | 72 | 0.06 | −12.0 |

TABLE 3-continued

Mapping Parameters

| Bit Rate kbps | Bit per Symbol | Sequence of Constellations | Minimum Frame Size | Size | Basic PAM Constellations $D_{min}$ | $F_{min}$ | PdBm |
|---|---|---|---|---|---|---|---|
| 40.5 | 5.0625 | 1 × 4D + 12 × 1D | 16 | 38/32 | 72 | 0.03 | −12.1 |
| 40 | 5 | 1 × 1D | 1 | 32 | 96 | 0.25 | −12.1 |

We claim:

1. A PAM mapper, comprising:

a) memory means for storing indications of an N-dimensional PAM constellation, where N is an integer greater than one;

b) code generation means coupled to said memory means, said code generation means for taking a group of incoming bits, for generating first and second indicators from said group of incoming bits by (i) dividing a value of said group of incoming bits by a constant to obtain two variables q and r, (ii) changing the value of q by a determined amount to obtain a modified variable q*, said q* being used to indicate a first of said indications of said N-dimensional PAM constellation, and (iii) comparing a function of q and a function of r to at least one threshold, and depending on said comparing, either using r or r* to indicate at least a second of said indications of said N-dimensional PAM constellation, where r* is a modified r according to an equation, wherein said code generation means generates PAM code from said first and second indications.

2. A PAM mapper according to claim 1, wherein:
said equation is a linear function of q and r.

3. A PAM mapper according to claim 2, wherein:
said linear function is of the form $r^* = k_1 - k_2 r - k_3 q$, where $k_1$, $k_2$, and $k_3$ are constants.

4. A PAM mapper according to claim 3, wherein:
$k_2 = 1$.

5. A PAM mapper according to claim 1, wherein:
said determined amount is one when said function of q relates in a first way to said threshold, and said determined amount is equal to q such that q* equals zero when said function of q relates in a second way to said threshold.

6. A PAM mapper according to claim 1, wherein:
said function of q is q,
said function of r is r, and
said determined amount is one when q is less than or equal to said threshold, and said determined amount is q, such that q* equals zero when q exceeds said threshold.

7. A PAM mapper according to claim 6, wherein:
said equation is a linear function of q and r.

8. A PAM mapper according to claim 7, wherein:
said linear function is of the form $r^* = k_1 - k_2 r - k_3 q$, where $k_1$, $k_2$, and $k_3$ are constants.

9. A PAM mapper according to claim 8, wherein:
$k_2 = 1$.

10. A PAM mapper according to claim 1, wherein:
said code generation means includes means for grouping incoming bits into said group of bits and into another group containing at least one sign bit.

11. A PAM mapper according to claim 10, wherein:
said N-dimensional PAM constellation is a two-dimensional constellation,
said means for grouping groups thirteen bits together as said group of bits, and groups two bits as sign bits, and
said code generation means generates said first and second indicators from said group of incoming bits by dividing said value of said group of incoming bits by 91 to obtain a quotient=q, and a remainder=r.

12. A PAM mapper according to claim 11, wherein:
said threshold is eighty-two.

13. A PAM mapper according to claim 11, further comprising:

c) output means for receiving said PAM code generated by said PAM code generation means, and for receiving said at least one sign bit, and for forming at least one output octet therefrom.

14. A PAM mapper according to claim 1, wherein:
said memory means stores indications for a plurality of PAM constellations.

15. A PAM mapper according to claim 14, wherein:
at least one of said plurality of PAM constellations is a one-dimensional constellation.

16. A method for mapping a plurality of incoming bits into PAM code outputs, comprising:

a) dividing a value of a group of said incoming bits by a constant to obtain two variables q and r;

b) changing the value of q by a determined amount to obtain a modified variable q*;

c) using said q* being to point to a first indication of an N-dimensional PAM constellation;

d) comparing a function of q and a function of r to at least one threshold;

d) as a result of said comparing, either using r or r* to point to a second indication of said N-dimensional PAM constellation, wherein r* is a modified r according to an equation; and e) generating PAM code from said first and second indications.

17. A method according to claim 16, wherein:
said determined amount is one when said function of q relates in a first way to said threshold, and said determined amount is equal to q such that g* equals zero when said function of q relates in a second way to said threshold.

18. A method according to claim 16, wherein:
said equation is a linear function of q and r.

19. A method according to claim 18, wherein:
said linear function is of the form $r^* = k_1 - k_2 r - k_3 q$, where $k_1$, $k_2$, and $k_3$ are constants.

20. A method according to claim 19, wherein:
said function of q is q,
said function of r is r, and
said determined amount is one when q is less than or equal to said threshold, and said determined amount is q, such that q* equals zero when q exceeds said threshold.

* * * * *